R. R. SCHEIBE.
STEP BEARING.
APPLICATION FILED MAR. 9, 1921.
1,385,400.
Patented July 26, 1921.
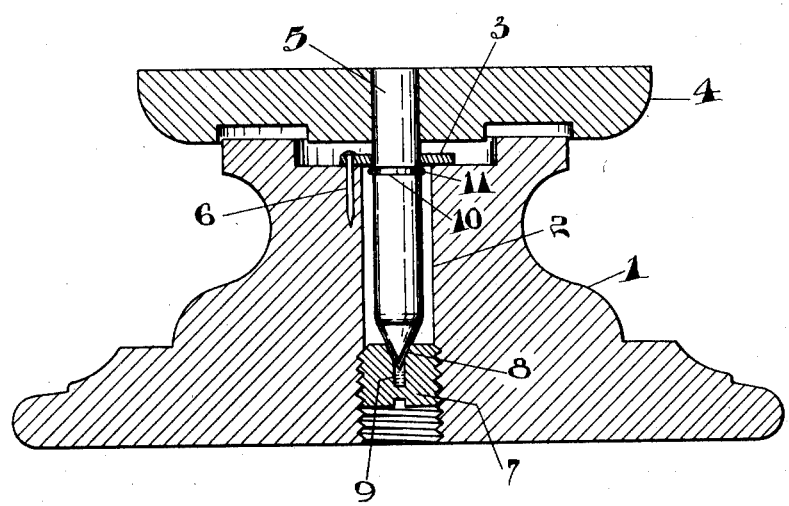
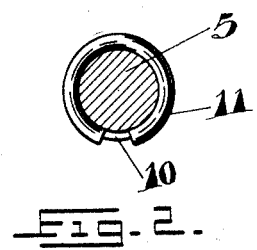
INVENTOR.
R. R. Scheibe.
BY J. Edward Maybee.
ATTY.

UNITED STATES PATENT OFFICE.

RALPH R. SCHEIBE, OF SOMERVILLE, MASSACHUSETTS.

STEP-BEARING.

1,385,400.     Specification of Letters Patent.     Patented July 26, 1921.

Application filed March 9, 1921. Serial No. 450,997.

*To all whom it may concern:*

Be it known that I, RALPH R. SCHEIBE, of Somerville, in the county of Middlesex, State of Massachusetts, United States of America, a citizen of the United States of America, have invented certain new and useful Improvements in Step-Bearings, of which the following is a specification.

This invention relates to bearings adapted for spindles requiring to be supported at their lower ends only, and particularly to bearings suitable for rotary holders for condiments, sauces and the like for table use or display purposes, and my object is to devise a cheap bearing which is easily and quickly assembled and which will give satisfactory service for a long period without repair or renewal.

I attain my object by means of the constructions hereinafter described and illustrated in the accompanying drawings in which—

Figure 1 is a vertical section of a step bearing constructed in accordance with my invention; and Fig. 2 a section of the spindle showing the retaining ring in position.

In the drawings like numerals of reference indicate corresponding parts in the different figures.

1 is a base or support, which will usually be of wood and has a vertical hole 2 extending through it. To the upper side of the support is secured a metal ring 3, the opening in the ring being of less diameter than the hole 2. This ring is secured in position by means of nails or screws 6.

4 is a rotatable part in which is secured the spindle 5, which spindle is of the same diameter as the opening in the ring 3. Into the lower end of the hole 2 is screwed a metal plug 7 in which the lower end of the spindle 5 is adapted to have a bearing. The lower end of this plug is preferably slotted as shown for engagement with a screw driver or other suitable tool. The lower end of the spindle is preferably coned and a similar shaped recess 8 is formed in the upper end of the plug 7 adapted to receive the coned end of the spindle. Preferably below the coned recess and communicating therewith there is formed in the plug an oil well 9, which is filled with oil when the bearing is first assembled. In the spindle is formed an annular groove 10, which groove is so located that when the parts 1 and 4 are in proper relationship, the groove will lie just below the under surface of the ring 3. This groove is adapted to receive a divided spring retainer 11, which will usually be formed of a piece of spring wire of circular cross section, the groove 10 being preferably of semi-circular cross section to partially receive the retainer.

The method of assembly is as follows. The spindle, having been suitably secured to the rotatable part 4, is inserted through the opening in the ring, care being taken in the first place to secure this ring in position with the center of the circular opening therein lying in the axis of the hole 2 so as to assure the spindle being perfectly alined with the hole. The spring retainer is then pushed up into place and sprung into the groove, its normal diameter being slightly less than that of the groove so that it tends to remain securely in position. The plug 7 is then screwed up into place until there is just sufficient play between the retainer and the under side of the ring 3 to permit of the free rotation of the spindle. The plug may then be securely held as adjusted by dropping a little glue into the hole from below.

Bearings constructed as described I find will satisfactorily attain the object of my invention as set out in the preamble of this specification.

What I claim as my invention is:—

1. A step bearing comprising a support having a vertical hole extending through the same; a ring secured to the upper side of the support about the hole, the opening in the ring being of less diameter than the hole in the support; a spindle passing through the ring and closely fitting in the same, said spindle having an annular groove formed therein below the ring; a plug screwed into the hole having a bearing formed in its upper end to receive the lower end of the spindle; and a divided spring retainer adapted to pass up between the spindle and the inner wall of the hole and engaged in the groove aforesaid.

2. A step bearing comprising a support having a vertical hole extending through the same; a ring secured to the upper side of the support about the hole; the opening in the ring being of less diameter than the hole in the support; a spindle passing through the ring and closely fitting in the same, said spindle having an annular groove formed therein below the ring; and a coned lower end; a plug screwed into the hole having a coned bearing formed in its upper end to receive the lower end of the spindle; and a divided spring retainer adapted to pass up between the spindle and the inner wall of the hole and engaged in the groove aforesaid.

3. A step bearing comprising a support having a vertical hole extending through the same; a ring secured to the upper side of the support about the hole, the opening in the ring being of less diameter than the hole in the support; a spindle passing through the ring and closely fitting in the same, said spindle having an annular groove formed therein below the ring; and a coned lower end; a plug screwed into the hole having a coned bearing formed in its upper end to receive the lower end of the spindle, and an oil well communicating with said bearing; and a divided spring retainer adapted to pass up between the spindle and the inner wall of the hole and engaged in the groove aforesaid.

Signed at Somerville, Mass., this 17th day of February, 1921.

RALPH R. SCHEIBE.

Witnesses:
 M. L. HATCH,
 E. L. LA ROSE.